(12) United States Patent
Guo et al.

(10) Patent No.: US 11,566,523 B2
(45) Date of Patent: Jan. 31, 2023

(54) MICROORGANISM CURING ANTI-SEEPAGE DEVICE BASED ON CAPSULE TRANSMISSION AND CONTROL

(71) Applicant: SOUTHWEST PETROLEUM UNIVERSITY, Sichuan (CN)

(72) Inventors: Liang Guo, Sichuan (CN); Xiaoyu He, Sichuan (CN); Junwei Zhang, Sichuan (CN); Mingwei Liao, Sichuan (CN); Hao Guo, Sichuan (CN); Latie Abu, Sichuan (CN); Chun Pei, Sichuan (CN); Ziwei Xiao, Sichuan (CN); Yiqi Peng, Sichuan (CN)

(73) Assignee: SOUTHWEST PETROLEUM UNIVERSITY, Sichuan (CN)

( * ) Notice: Subject to any disclaimer, the term of this patent is extended or adjusted under 35 U.S.C. 154(b) by 328 days.

(21) Appl. No.: 16/936,127

(22) Filed: Jul. 22, 2020

(65) Prior Publication Data
US 2020/0347724 A1 Nov. 5, 2020

(30) Foreign Application Priority Data
Feb. 26, 2020 (CN) .......................... 202010121517.1

(51) Int. Cl.
| | |
|---|---|
| *B28C 5/14* | (2006.01) |
| *E21D 11/10* | (2006.01) |
| *E21D 11/38* | (2006.01) |
| *C09K 8/42* | (2006.01) |

(52) U.S. Cl.
CPC ................ *E21D 11/38* (2013.01); *B28C 5/14* (2013.01); *C09K 8/42* (2013.01)

(58) Field of Classification Search
CPC ..... E21D 11/381; E21D 11/10; E21D 11/105; B28C 7/00; B28C 5/08; B28C 5/12; B28C 5/14
See application file for complete search history.

(56) References Cited

FOREIGN PATENT DOCUMENTS

CN 110359930 A * 10/2019

OTHER PUBLICATIONS

Machine Translation of CN 110359930 A, pp. 7 (Year: 2019).*

* cited by examiner

*Primary Examiner* — Sunil Singh (57) ABSTRACT

A microorganism curing anti-seepage device based on capsule transmission and control includes a stock bin which includes a mixing bin and an oil storage bin separated from the mixing bin. A feed pipe and an oil injection pipe are provided on the stock bin. A central shaft is rotatably provided within the mixing bin. A stirring component is provided on the central shaft. A delivery pipe is provided at a bottom portion of the mixing bin, an oil conduit is provided at a bottom portion of the oil storage bin, a jet pipe is provided at a junction of the oil conduit and the delivery pipe. Since microbial capsules are decomposed layer by layer, after the microbial capsules reach fissures, the microbial bacteria, the nutrient solution and the curing liquid are released step by step, and then calcium carbonate is induced by microorganisms to achieve solidification and anti-seepage of fissures.

7 Claims, 4 Drawing Sheets

Fig. 6

MICROORGANISM CURING ANTI-SEEPAGE DEVICE BASED ON CAPSULE TRANSMISSION AND CONTROL

CROSS REFERENCE OF RELATED APPLICATION

The present invention claims priority under 35 U.S.C. 119(a-d) to CN 202010121517.1, filed Feb. 26, 2020.

BACKGROUND OF THE PRESENT INVENTION

Field of Invention

The present invention relates to the field of tunnel engineering anti-seepage technology, and more particularly to a microorganism curing anti-seepage device based on capsule transmission and control for fractured rock masses.

Description of Related Arts

Water seepage is one of the most common diseases in tunnel engineering. The water seepage in the tunnel will seriously affect the use of the tunnel and even threaten its long-term stability and safe operation. In order to ensure the long-term stable and safe operation of the tunnel, anti-seepage has always been a focal issue in the field of tunnel engineering.

At present, the tunnel anti-seepage technology mostly uses pressure grouting to block seepage water fissures to prevent groundwater seepage from surrounding rocks during operation. According to different grouting materials, there are three grouting methods which are respectively cement grouting, chemical grouting and mixed slurry grouting. The cement grouting method comprises injecting the curable cement slurry into voids of surrounding rocks, for preventing the water seepage through replacement, filling, and squeezing; and however, cement particles are too many and large to be effectively grouted into micro fissures; and moreover, after being hardened, the cement slurry easily precipitates water, so that the volume of solid phase shrinks, promoting new water seepage channels. The chemical grouting method comprises making specific chemical raw materials into a true solution, pumping a chemical grout into seepage fissures of tunnel surrounding rocks with a pressure delivery device, for infiltration, diffusion, gelatinization and solidification, so as to fill fissures, thereby achieving an function of anti-seepage. However, the diffusion and retention of chemical grout in the surrounding rocks will inevitably pollute the surrounding soil-water environment, which has an inherent defect of ecological unfriendliness. The mixed slurry grouting comprises injecting the mixed slurry of cement and fly ash into fissures under a certain pressure, the mixed slurry producing physicochemical reaction, displacing a water space to block watercourses such as fissures, and however, the inherent time-varying viscosity characteristic of mixed slurry often results in uneven spatial distribution of viscosities in a slurry diffusion area, which greatly reduces the water anti-seepage.

In recent years, with the widespread application of microbially induced carbonate precipitation (MICP) in the field of geotechnical engineering, the microbial grouting technology has been increasingly applied to the field of anti-seepage of tunnel surrounding rocks. Through infusing a bacterial solution and a cementation solution which is a mixture of urea and calcium chloride into the seepage fissures, the calcium carbonate induced by microorganisms is deposited to fill the fissures, thereby preventing groundwater from seeping out of the fissures of the deep surrounding rocks. The microbial grouting technology has advantages of green environmental protection, environmental friendliness, simple construction and low cost. In addition, due to the low viscosity, the used bacterial solution and cementation solution are easier to transport and diffuse in geotechnical media than traditional cement slurry. Therefore, the scope of water seepage prevention is greatly expanded. However, in the existing microbial grouting technology, the bacterial solution and the solidified substance are injected into the target fissures in the form of solution or suspension. The early solidified product at the grouting port will inevitably hinder migration and diffusion of the subsequent slurry, and the grouting range is inevitably limited. Therefore, the best anti-seepage effect is unable to be achieved.

SUMMARY OF THE PRESENT INVENTION

An object of the present invention is to provide a microorganism curing anti-seepage device based on capsule transmission and control, which is able to solve problems of micro-fissure expansion which is caused by the pollution from traditional grouting methods to the environment, and excessive pressure caused by ordinary microbial grouting, and is able to block water-rich fissures in a wide range.

To solve the above technical problem, the present invention provides a technical solution as follows.

A microorganism curing anti-seepage device based on capsule transmission and control comprises a stock bin which comprises a mixing bin and an oil storage bin separated from the mixing bin, wherein a feed pipe communicated with the mixing bin is provided on the stock bin, microbial capsules and water enter the mixing bin through the feed pipe, an oil injection pipe communicated with the oil storage bin is provided on the stock bin, a central shaft is rotatably located within the mixing bin, a stirring component is provided on the central shaft, a delivery pipe is provided at a bottom portion of the mixing bin, an oil conduit communicated with the delivery pipe is provided at a bottom portion of the oil storage bin, a jet pipe is provided at a junction of the oil conduit and the delivery pipe, an adjustment component is provided on the delivery pipe for controlling opening or closing between the delivery pipe and the jet pipe.

In the existing microbial grouting technology, the bacterial solution and the solidified substance are injected into fissures in a form of solution, an early solidified product at a grouting port will inevitably hinder migration and diffusion of a subsequent slurry, and a grouting range is inevitably limited. Therefore, the best anti-seepage effect is unable to be achieved. Especially for fissured rock masses with widely distributed micro-fissures, in order to allow the bacterial solution and the solidified solution to enter the fissures smoothly, it is often necessary to significantly increase a grouting pressure. However, an excessive grouting pressure will inevitably expand the fissures and further communicate the fissures with each other, and eventually evolve into a smoother water seepage channel. Obviously, water seepage prevention is counterproductive. After repeated researches, the applicant invents a microbial curing anti-seepage device. Microbial bacteria, a nutrient solution and a curing solution are compounded into a multi-layer microbial capsule, based on the principle that the microbial capsule is decomposed layer by layer, after the microbial capsule reaches fissures, the microbial bacteria, the nutrient solution and the curing solution are released step by step, and then calcium carbonate crystals are induced by microorganisms to achieve solidification and anti-seepage of the fissures. Moreover, according to the time required for the microbial capsule to decompose layer by layer, while using the microorganism curing anti-seepage device, the microbial capsule is injected under low pressure instead of conventional high pressure. On the premise of ensuring that the microbial bacteria, the nutrient solution and the curing solution smoothly enter into the fissures, the solidified product is avoided forming at the grouting port, thereby preventing the solidified product from hindering migration and diffusion of the subsequent slurry.

During using, proven tunnel leakage points are firstly drilled; microbial capsules, water and booster oil are placed in a raw material conveyor; the microbial capsules and the water enter a mixing bin through a feed pipe, are thoroughly mixed with each other through repeated stirring of a stirring component, and then enter an adjustment component through a delivery pipe; the booster oil enters the oil storage bin through an oil injection pipe, and then enters a jet pipe through an oil conduit; during the above process, the booster oil is continuously injected, an end of the jet pipe is docked with the fissures; with an increase of an quantity of the microbial capsules and the water in the delivery pipe, the delivery pipe is intermittently provided with low pressure for further driving the adjustment component, so as to change an initial closed state of the delivery pipe, that is to say, that the delivery pipe is communicated with the jet pipe and is periodically provided with low pressure, so that opening and closing between the delivery pipe and the jet pipe changes periodically. It is able to be known that a mixture of the microbial capsules and the water is regularly and quantitatively squeezed into the continuously circulating booster oil, a material injected into the fissures from the jet pipe is a fluid in which the mixture and the booster oil are alternately distributed. After an outer wall of the microbial capsules is decomposed, based on an oleophobicity of an internal substance of the microbial capsules, the booster oil is able to promote the internal substance of the microbial capsules to move to a deep part of the fissures after entering the fissures, expanding a scope of solidification and impermeability.

The stirring component, which comprises two-stage stirring blades, is able to form a large-scale circulating flow field around the stirring blades in the mixing bin, for further driving the water and the microbial capsules to continuously circulate and flow, which ensures that the water and the microbial capsules enter the delivery pipe after being uniformly stirred, and avoids the microbial capsule aggregation while mixing the water and the microbial capsules with the booster oil, thereby improving a curing anti-seepage efficiency of the fissures.

A lower end of the feed pipe is closed and located within the mixing bin, an outer diameter of the lower end of the feed pipe decreases along an axis thereof towards a middle portion of the mixing bin. A fan blade is provided at a middle portion of an inner wall of the lower end of the feed pipe. A lower end surface of the feed pipe has multiple discharge holes communicated with the mixing bin, a water injection pipe coaxial with the fan blade is provided within the feed pipe, two side walls of the teed pipe has two feed holes, respectively. In the raw material conveyor, the microbial capsules and the water are separated from each other for long-term storage. During the usage, the water is injected vertically downwards from the water injection pipe, the microbial capsules are injected from the two feed holes in the two side walls of the feed pipe, the water from the water injection pipe directly flushes the fan blade for driving the fan blade to rotate, the water and the microbial capsules are primarily mixed under a stirring action of the fan blade, the primarily mixed water and microbial capsules enter the mixing bin through the discharge holes and then are secondarily mixed with the stirring component in the mixing bin, so as to ensure a uniform mixing of the water and the microbial capsules.

A duct is provided at a bottom portion of the mixing bin, and is communicated with a first pressure compartment through a second booster pump, the delivery pipe is communicated with the first pressure compartment; an oil outlet pipe is provided at a bottom portion of the oil storage bin, and is communicated with a second pressure compartment through a first booster pump, the oil conduit is communicated with the second pressure compartment. Both the first booster pump and the second booster pump are able to provide a low pressure for the microbial capsules and the water in the delivery pipe and the booster oil in the oil conduit. The first booster pump and the second booster pump are different in pressurized methods, namely, the second booster pump periodically pressurizes the delivery pipe, the first booster pump continuously pressurizes the oil conduit, a pressure applied by the second booster pump is greater than a pressure applied by the first booster pump, which ensures that the water and the microbial capsules are smoothly squeezed into the booster oil.

The microorganism curing anti-seepage device provided by the present invention further comprises a first grouting cylinder, wherein a protective housing is provided at an upper end of the first grouting cylinder and is communicated with an interior of thereof; a round housing is provided at a lower end of the first grouting cylinder and is communicated with the interior of thereof; a cam is rotatably located within the round housing, a piston is slidably located within the first grouting cylinder; a connecting rod is hinged with the piston, a lower end of the connecting rod is hinged with a protrusion of the cam; two valve bodies are provided within the protective housing, wherein one side of one of the two valve bodies is connected with one side of another of the two valve bodies; two ends of each of the two valve bodies has two return holes along an axis thereof, respectively; a stop block is slidably located within each return hole, two stop blocks corresponding to each of the two valve bodies are connected with each other through a linkage rod; a compression spring is provided within one of the two valve bodies, one end of the compression spring is connected with an inner wall of the one of the two valve bodies, another end of the compression spring is connected with a stop block which is located at a lower end of the one of the two valve bodies; two eccentric wheels are rotatably located within the protective housing, each of the two eccentric wheels is corresponding to a stop block located at an upper end of the one of the two valve bodies; a lower end portion of another side wall of the one of the two valve bodies has a first through-hole, a lower end portion of another side wall of the another of the two valve bodies has a second through-hole, the first through-hole is communicated with the delivery pipe, the second through-hole is communicated with an output pipe, the output pipe is communicated with the jet pipe through the adjustment component; a first protuberance which is provided on the one side wall of the one of the two valve bodies is opposite to the first through-hole; a second protuberance which is provided on the one side wall of the another of the two valve bodies is opposite to the second through-hole; a support rod is provided at a lower surface of the stop block which is located the upper end of the one of the two valve bodies, a sealing plate is provided at a lower end of the support rod for controlling opening or closing of a lower end surface of the one of the two valve bodies. The first grouting cylinder is configured to intermittently inject the mixture of the water and the microbial capsules. When the mixture enters the first through-hole through the delivery pipe, one eccentric wheel corresponding to the first through-hole rotates, the one protrusion of the one eccentric wheel presses downwardly the stop block which is located at the upper end of one valve body, so as to drive the sealing plate of the one valve body to move towards a middle portion of the first grouting cylinder; at this time, the delivery pipe is communicated with the first grouting cylinder, a large amount of the mixture enter the first grouting cylinder, another eccentric wheel corresponding to another valve body rotates, another protrusion of the another eccentric wheel presses downwardly another stop block which is located at an upper end of the another valve body, so as to communicate the first grouting cylinder with the jet pipe; at this time, the cam located within the round housing rotates for driving the connecting rod and the piston to move upwardly, which means that the mixture within the first grouting cylinder is driven to enter the jet pipe; under an action of the adjustment component, the mixture within the first grouting cylinder is regularly and quantitatively injected into the jet pipe for ensuring that the mixture and the booster oil in the jet pipe are distributed in the staggered manner.

The adjustment component comprises a limit ring, a tension spring, a slider and a bottom plate; the limit ring is fixed on an inner circumferential wall of the output pipe, the slider is cylindrical and is slidably located within the output pipe, an outer diameter of the slider is the same as an inner diameter of the output pipe, one end of the tension spring is connected with one end surface of the slider, another end of the tension spring is connected with a side wall of the limit ring; the slider has a connecting hole at the one end surface of the slider near the tension spring along an axis direction of the slider; the slider has a mixing hole at another end of the slider away from the tension spring along a radial direction of the slider; the mixing hole is communicated with the connecting hole; the bottom plate is fixed on another end surface of the slider away from the tension spring, and is located at a junction of the output pipe and the jet pipe for closing a circulation cross section of the output pipe. The adjustment component is configured to control the output of the water and the microbial capsules in the output pipe. The mixture is primarily quantitatively outputted in the first grouting cylinder and then enters the output pipe, the piston is able to pressurize the quantitatively outputted mixture to some extent; when the pressure reaches an upper limit, the mixture enters the mixing hole via the connecting hole, and at the same time the mixture drives the slider to move away from the limit ring till the mixing hole completely enters the jet hole. At the same time, the slider is driven into the jet pipe till the mixing hole is coaxial with the jet pipe. The mixture in a form of fluid flows into the continuously flowing booster oil. When the mixture in the first grouting cylinder stops outputting, the tension spring which is connected with the slider is recovered, so that the slider is driven to an original state of the tension spring, the output pipe is closed again. Obviously, through the output adjustment of the mixture for twice, the flowing fluids in the jet hole are the mixture and the booster oil which are distributed in the staggered manner, thereby maximizing a curing effect of the water, the microbial capsules and the booster oil entering the fissures to the greatest extent.

The microorganism curing anti-seepage device provided by the present invention further comprises a second grouting cylinder. The first grouting cylinder and the second grouting cylinder are same in structure, a third through-hole of the second grouting cylinder is communicated with the oil conduit, a fourth through-hole of the second grouting cylinder is communicated with the jet pipe through a discharge pipe. Through the first grouting cylinder and the second grouting cylinder with same structure, the mixture and the booster oil are respectively quantitatively controlled for alternately injecting the mixture and the booster oil into the jet pipe.

The stirring component comprises two main stirring blades and an assistant stirring blade; the two main stirring blades are fixed on an outer circumferential wall of the central shaft and respectively located at two sides of the assistant stirring blade, each of the two main stirring blades has multiple water permeable holes, a shaft sleeve is sleeved on the central shaft, a circular groove is provided on an inner circumferential wall along a circumferential direction of the shaft sleeve, two limit blocks are symmetrically provided within the circular groove, two servo modules are symmetrically provided on the outer circumferential wall of the central shaft, the two servo modules and the two limit blocks are distributed in the staggered manner. The water and the microbial capsules are primarily mixed in the feed pipe for avoiding conglobation of the microbial capsules in the mixing bin. After entering the mixing bin, the primarily mixed water and microbial capsules are secondarily mixed with the stirring component, so as to ensure that the water and the microbial capsules are always uniformly distributed in the delivery pipe and the jet pipe. The two main stirring blades and the assistant stirring blade are provided on the central shaft. A length of the assistant stirring blade is smaller than a length of the two main stirring blades in a radial direction of the central shaft, and the assistant stirring blade is opposite to a lower end of the teed pipe. Before staring the stirring component, the water and the microbial capsules are continuously injected into the feed pipe; when the quality of the water and the microbial capsules in the mixing bin reaches a certain level, the central shaft is started, the water and the microbial capsules are continuously injected into the feed pipe, multiple streams of fluids formed by the water and the microbial capsules firstly flush the assistant stirring blade, for driving the assistant stirring blade to rotate, so as to prevent microbial capsules overflowing from the discharge hole from conglobation in a water environment.

The microbial capsule comprises a capsule inner membrane, a microbial protective membrane and a polyvinyl alcohol membrane from outside to inside in sequence, wherein the polyvinyl alcohol membrane is filled with calcium chloride, a microbial culture medium is filled between the microbial protective membrane and the polyvinyl alcohol membrane, a degreasing agent is filled between the capsule inner membrane and the microbial protective membrane, multiple oleophobic coatings are coated on an outer wall of the capsule inner membrane. Moreover, after the microbial capsules are injected into the fissures, the multiple oleophobic coatings are mutually exclusive with the booster oil for driving the microbial capsules to move towards the deep part of the fissures. After the microbial protective membrane is decomposed, microorganisms start to develop and reproduce. After a few days of microbial development and reproduction, the decomposition of the polyvinyl alcohol membrane is completed. After overflowing, calcium chloride powders solidify with the microorganisms and produce calcium carbonate precipitation, thereby achieve the effect of anti-seepage of microfissures. The polyvinyl alcohol membrane is also called as PVA membrane which is a colorless, non-toxic and non-corrosive biodegradable water-soluble organic polymer. The time required for hydrolysis of capsule materials with different alcoholysis degrees is different. The alcoholysis degree of the polyvinyl alcohol membrane provided by the present invention is 79.8%, which is able to ensure after the capsule inner membrane and the microbial protective membrane are hydrolyzed, calcium chloride begins to be released.

The microbial capsule further comprises a capsule outer membrane wrapped around the capsule inner membrane, wherein a foaming agent outer membrane is provided between the capsule outer membrane and the capsule inner membrane, the foaming agent outer membrane is filled with a foaming agent. An interior of the foaming agent outer membrane is pressurized with a pressure in a range of 0.12 MPa to 0.19 MPa. Generally, a pressure in waterless fissures is in a range of 0.1 MPa to 0.11 MPa, which is able to ensure that the foaming agent outer membrane is able to be broken in time while encountering the waterless fissures. The foaming agent particles are obtained by a method, the method comprising steps of: sterilizing a sodium alginate solution and a calcium carbonate solution, and then mixing with aluminum chloride powders and polyurethane foam, and then adding 40 ml of soybean oil containing Tween 80, stirring under a stirring speed of 400 rpm at 4° C. for 15 min, emulsifying, add 10-20 ml of soybean oil containing 0.5% glacial acetic acid, stirring under the stirring speed of 400 rpm at 4° C. for 30 min, adding 60 ml of acetate solution, standing for 2 h, and centrifugally stirring for 10 min under a stirring speed of 4000 rpm to obtain the foaming agent particles.

The capsule outer membrane, the capsule inner membrane, the foaming agent outer membrane and the microbial protective membrane are all made from sodium alginate, which is able to ensure that hydrolysis is achieved within a short time after the microbial capsules are injected into the target fissures.

Compared with prior arts, the present invention has some advantages and beneficial effects as follows.

(1) According to the present invention, microbial bacteria, a nutrient solution and a curing solution are compounded into a multi-layer microbial capsule, based on the principle that the microbial capsule is decomposed layer by layer, after the microbial capsule reaches fissures, the microbial bacteria, the nutrient solution and the curing solution are released step by step, and then calcium carbonate crystals are induced by microorganisms to achieve solidification and anti-seepage of the fissures. Moreover, the microbial capsule is injected under low pressure for ensuring that the microbial bacteria smoothly enter the fissures and the solidified product is avoided forming at the grouting port, thereby preventing the solidified product from hindering migration and diffusion of the subsequent slurry.

(2) According to the present invention, the foaming agent outer membrane is provided between the capsule outer membrane and the capsule inner membrane, the foaming agent outer membrane is filled with the foaming agent. When the microbial capsule is transported in the fissure network, the capsule outer membrane is hydrolyzed, the capsule inner membrane and the foaming agent outer membrane migrate separately. During the migration, the foaming agent outer membrane is gradually hydrolyzed. After encountering the air enriched in the invalid fissures, the volume of the substances in the foaming agent outer membrane are immediately expanded, for quickly blocking ports of the invalid fissures.

(3) According to the present invention, after the microbial capsules are injected into the fissures, the multiple oleophobic coatings on the capsule inner membrane are mutually exclusive with the booster oil for driving the microbial capsules to move towards the deep part of the fissures. When the capsule inner membrane is rapidly hydrolyzed, the degreasing agent reacts with the booster oil. The degreasing agent has a strong affinity for the booster oil, so that small particles of oil-in-water emulsion are formed for dissolving the booster oil, thereby avoiding fissure blockage. After the microbial protective membrane is decomposed, the activity of the microorganisms in water is activated, and the microorganisms start to develop and reproduce. After a few days of microbial development and reproduction, the decomposition of the polyvinyl alcohol membrane is completed. After overflowing, calcium chloride powders solidify with the microorganisms and produce calcium carbonate precipitation, thereby achieve the effect of anti-seepage of microfissures.

BRIEF DESCRIPTION OF THE DRAWINGS

The drawings described herein are used to provide a further understanding of the embodiments of the present invention, form a part of the present application, and do not constitute a limitation on the embodiments of the present invention.

In the drawings, reference numbers and corresponding element names are as follows.

1: stock bin; 2: feed pipe; 3: water injection pipe; 4: feed hole; 5: fan blade; 6: discharge hole; 7: oil injection pipe; 8: central shaft; 9: mixing bin; 10: oil storage bin; 11: oil outlet pipe; 12: first booster pump; 13: second pressure compartment; 14: oil conduit; 15: jet pipe; 16: main stirring blade; 17: water permeable hole; 18: assistant mixing blade; 19: duct; 20: second booster pump; 21: delivery pipe; 22: stop block; 23: valve body; 24: compression spring; 25: protective housing; 26: sealing plate; 27: discharge pipe; 28: piston; 29: connecting rod; 30: first grouting cylinder; 31: cam; 32: limit ring; 33: tension spring; 34: slider; 35: connecting hole; 36: mixing hole; 37: bottom plate; 38: output pipe; 39: calcium chloride; 40: shaft sleeve; 41: circular groove; 42: servo module; 43: limit block; 44: capsule outer membrane; 45: oleophobic coating; 46: capsule inner membrane; 47: degreasing agent; 48: foaming agent; 49: foaming agent outer membrane; 50: microbial protective membrane; 51: microbial culture medium; 52: polyvinyl alcohol membrane; 53: first pressure compartment; 54: round housing; 55: protrusion; 56: linkage rod; 57: eccentric wheel; 58: second grouting cylinder; 59: return hole; 60: first protuberance; 61: support rod; 62: second protuberance; 63:

first through-hole; 64: second through-hole; 65: third through-hole; 66: fourth through-hole; 400: microbial capsule.

DETAILED DESCRIPTION OF THE PREFERRED EMBODIMENT

In order to make the objectives, technical solutions and advantages of the present invention clearer, the present invention will be further described in detail as below with accompanying drawings and embodiments. It should be understood that the specific embodiments described herein are merely illustrative of the present invention and are not intended to limit the present invention.

First Embodiment

Referring to FIGS. 1 to 5 of the drawings, according to the first preferred embodiment of the present invention, proven tunnel leakage points are firstly drilled; microbial capsules 400, water and booster oil are stored independently in a raw material conveyor; a stock bin 1 is divided into a mixing bin 9 and an oil storage bin 10; the microbial capsules and the water enter the mixing bin 9 through a feed pipe 2, are thoroughly mixed with each other through repeated stirring of a stirring component, and then enter an adjustment component through a delivery pipe 21; the booster oil enters the oil storage bin 10 through an oil injection pipe 7, and then enters a jet pipe 15 through an oil conduit 14; during the above process, the booster oil is continuously injected, an end of the jet pipe 15 is docked with fissures; with an increase of an quantity of the microbial capsules and the water in the delivery pipe 21, the delivery pipe 21 is intermittently provided with low pressure for further driving the adjustment component, so as to change an initial closed state of the delivery pipe 21, that is to say, that the delivery pipe 21 is communicated with the jet pipe 15 and is periodically provided with low pressure, so that opening and closing between the delivery pipe 21 and the jet pipe 15 changes periodically. It is able to be known that a mixture of the microbial capsules and water is regularly and quantitatively squeezed into the continuously circulating booster oil, a material injected into the fissures from the jet pipe 15 is a fluid in which the mixture and the booster oil are alternately distributed. After an outer wall of the microbial capsules is decomposed, based on an oleophobicity of an internal substance of the microbial capsules, the booster oil is able to promote the internal substance of the microbial capsules to move towards a deep part of the fissures after entering the fissures, expanding a scope of solidification and impermeability.

Figure 1:
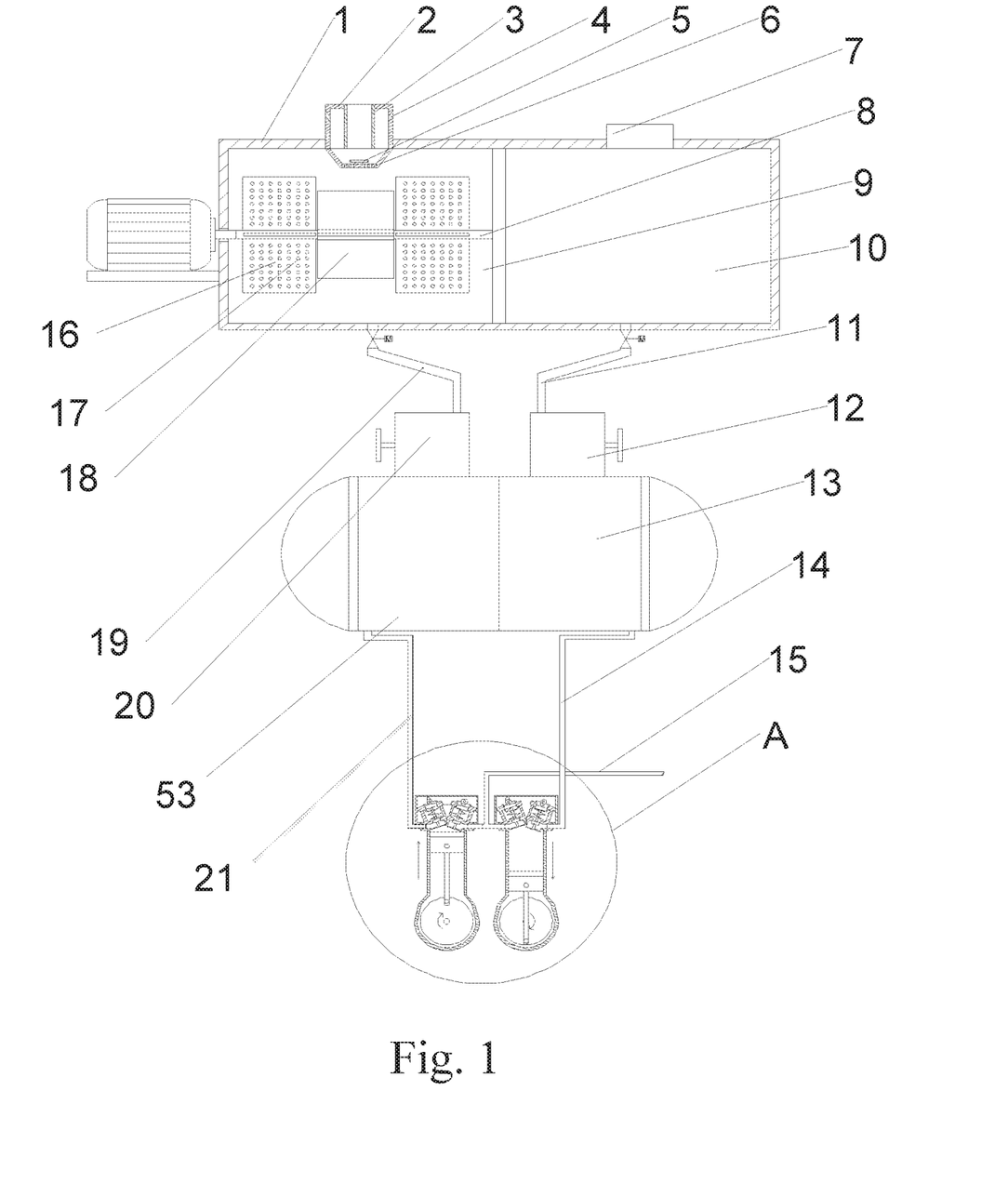
FIG. 1 is a structurally schematic view of the present invention.
Figure 2:
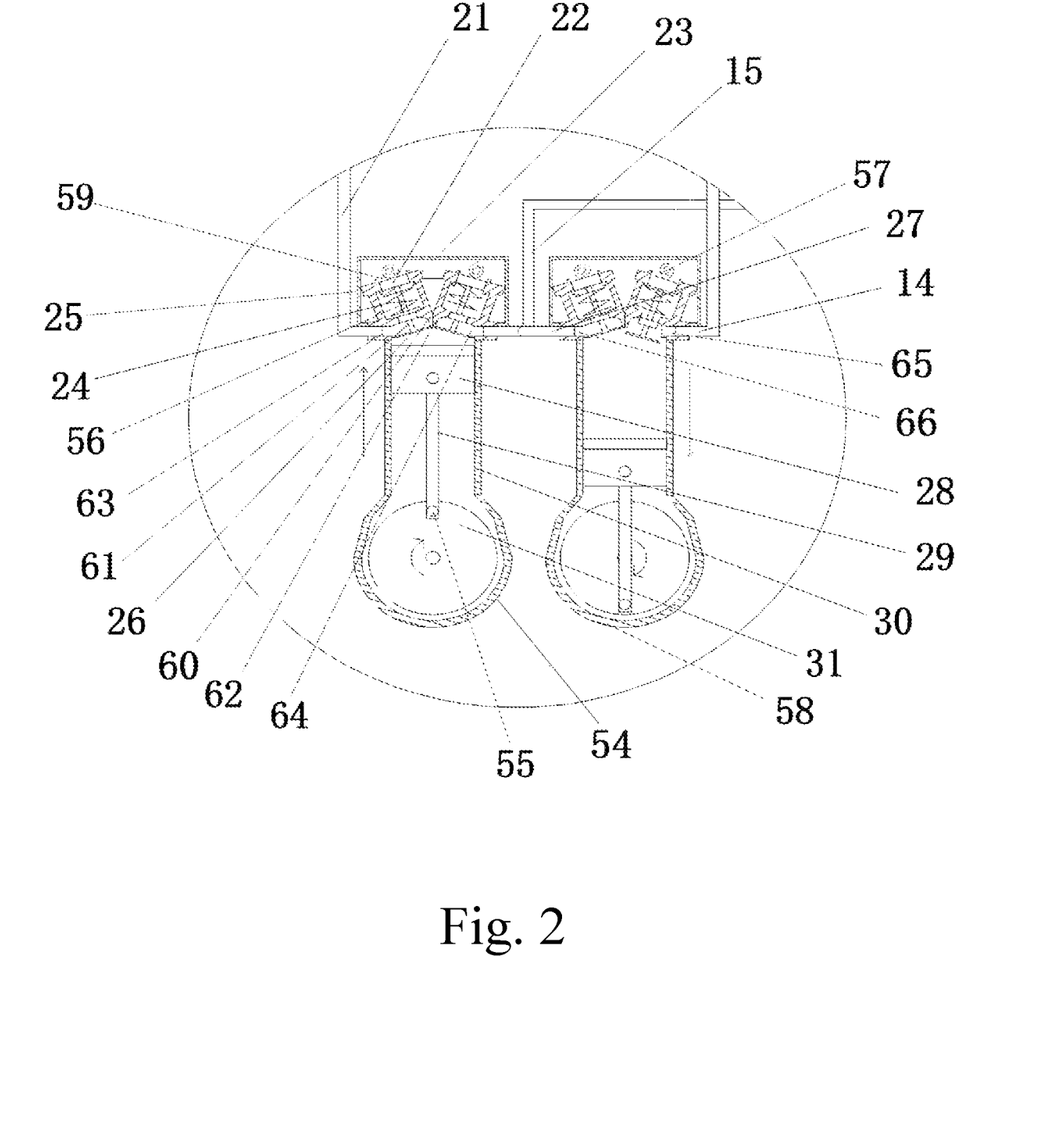
FIG. 2 is a partial enlarged view of FIG. 1.
Figure 3:
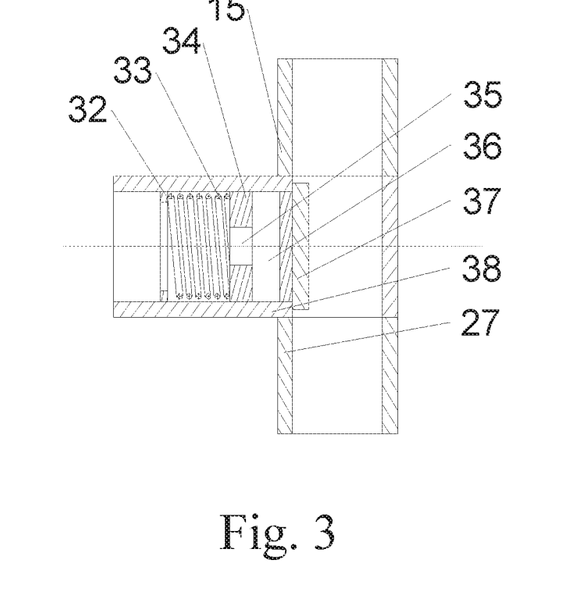
FIG. 3 is a structurally schematic view of an adjustment component.

According the preferred embodiment of the present invention, a first pressure compartment 53 is configured to temporary storage and voltage regulation of the microbial capsules and the water, a second pressure compartment 13 is configured to temporary storage and voltage regulation of the booster oil; a duct 19 is located at a bottom portion of the mixing bin 9, the duct 19 is communicated with the first pressure compartment 53 through a second booster pump 20, the delivery pipe 21 is communicated with the first pressure compartment 53; an oil outlet pipe 11 is located at a bottom portion of the oil storage bin 10, the oil outlet pipe 11 is communicated with the second pressure compartment 13 through a first booster pump 12, the oil conduit 14 is communicated with the second pressure compartment 13; both the second booster pump 20 and the first booster pump 12 are able to provide a low pressure for the microbial capsules and the water in the delivery pipe 21 and the booster oil in the oil conduit 14, respectively; the second booster pump 20 and the first booster pump 12 are different in pressurized methods; the second booster pump 20 periodically pressurizes the delivery pipe 21, the first booster pump 12 continuously pressurizes the oil conduit 14, a pressure applied by the second booster pump 20 is greater than a pressure applied by the first booster pump 12, so as to ensure that the water and microbial capsules are smoothly squeezed into the booster oil.

Second Embodiment

Referring to FIGS. 1 to 5 of the drawings, the water and the microbial capsules are mixed for twice, namely, primarily mixed in the feed pipe 2 and then secondarily mixed in the mixing bin 9. In the raw material conveyor, the microbial capsules and the water are separated from each other for long-term storage. During the primary stirring, the water is injected vertically downwards from a water injection pipe 3, the microbial capsules are injected from two feed holes 4 in two side walls of the feed pipe 2, the water from the water injection pipe 3 directly flushes a fan blade 5 for driving the fan blade 5 to rotate, the water and the microbial capsules are primarily mixed under a stirring action of the fan blade 5, the primarily mixed water and microbial capsules enter the mixing bin 9 through multiple discharge holes 6 and then are secondarily mixed with the stirring component in the mixing bin 9, so as to ensure a uniform mixing of the water and the microbial capsules.

Figure 4:
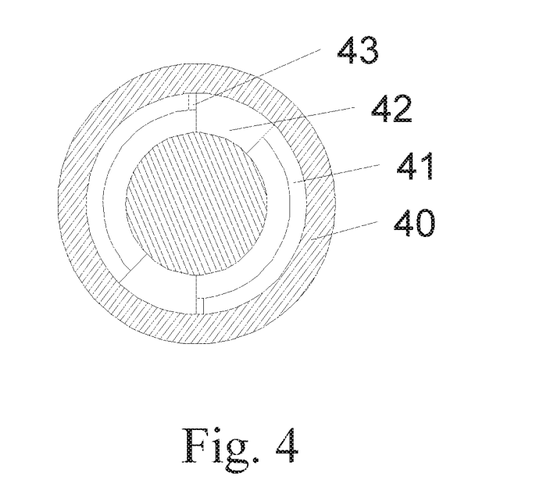
FIG. 4 is a structurally schematic view of a shaft sleeve.
Figure 5:
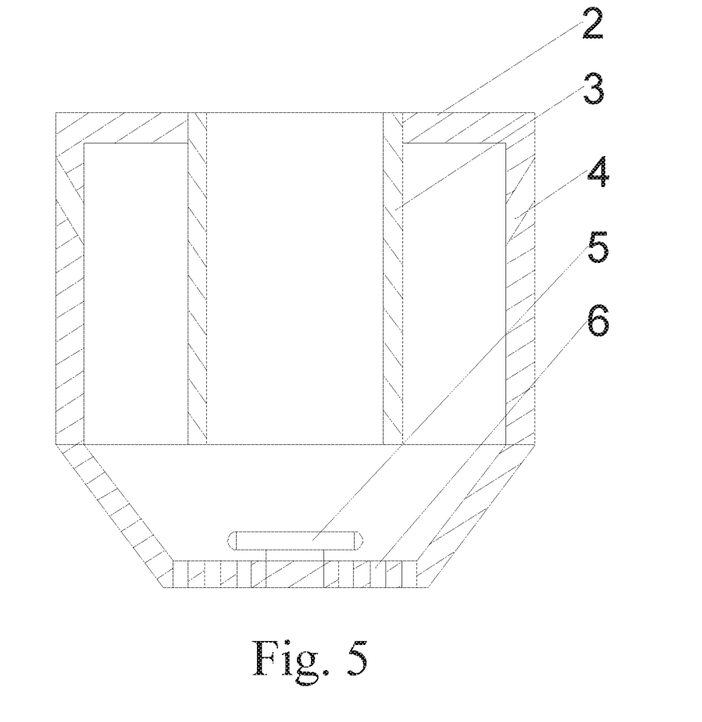
FIG. 5 is a structurally schematic view of a feed pipe.

The water and the microbial capsules are primarily mixed in the feed pipe 2 for avoiding conglobation of the microbial capsules in the mixing bin 9. After entering the mixing bin 9, the primarily mixed water and microbial capsules are secondarily mixed with the stirring component in the mixing bin 9, so as to ensure that the water and the microbial capsules are uniformly distributed in the delivery pipe 21 and the jet pipe 15. Two main stirring blades 16 and an assistant stirring blade 18 are provided on a central shaft 8, the assistant stirring blade 18 is rotatably located on the central shaft 8 through a shaft sleeve 40, a circular groove 41 is provided on an inner circumferential wall along a circumferential direction of the shaft sleeve 40, two limit blocks 43 are symmetrically provided within the circular groove 41, two servo modules 42 are symmetrically provided on an outer circumferential wall of the central shaft 8, the two servo modules 42 and the two limit blocks 43 are distributed in a staggered manner, the two main stirring blades 16 are fixed to the central shaft 8, each of the two main stirring blades 16 has multiple water permeable holes 17. When the central shaft 8 rotates, the two main stirring blades 16 rotate with the central shaft 8; after one of the two limit blocks 43 contacts with one of the two servo modules 42, the assistant stirring blade 18 is just able to rotate with the central shaft 8; at this time, under an action of the two main stirring blades 16, one circulating flow field is formed at two sides of the mixing bin 9 for driving the microbial capsules and the water in the mixing bin 9 to continuously roll and stir; when the assistant stirring blade 18 rotate with the central shaft 8, another circulating flow field is formed in a middle of the mixing bin 9. Accordingly, with an increase of a stirring time, the one circulating flow field and the another circulating flow field, respectively formed by the two main stirring blades 16 and the assistant stirring blade 18, are combined, so that a stirring effect in the mixing bin 9 is optimized, thereby ensuring that the microbial capsules and the water in the mixing bin 9 are uniformly distributed.

Third Embodiment

Referring to FIGS. 1 to 5 of the drawings, the mixing of microbial capsules, water and booster oil is achieved by two methods as follows.

Figure 6:
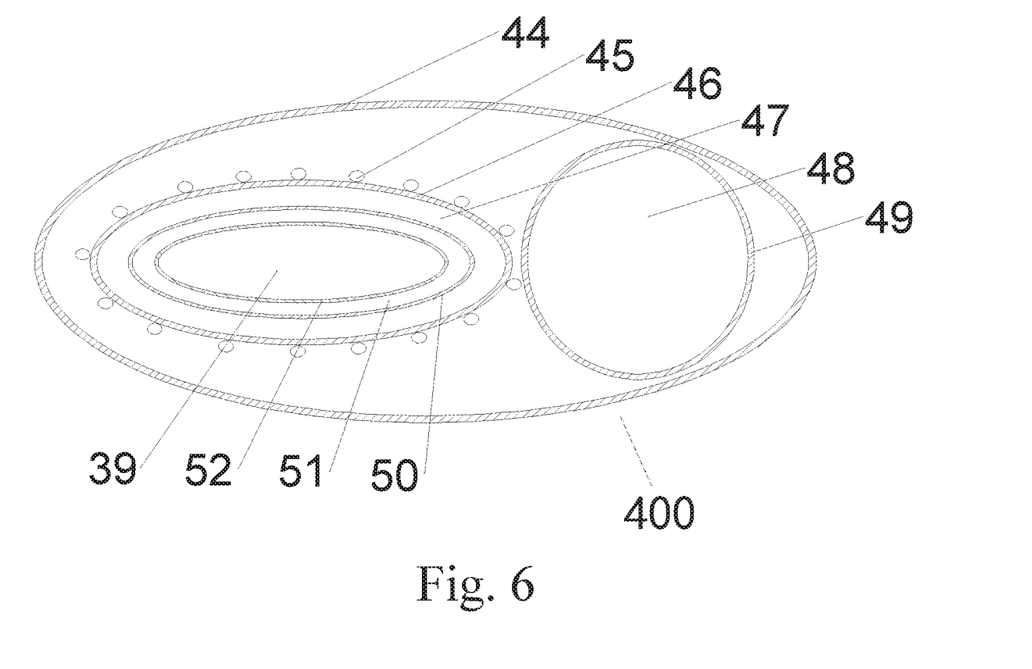
FIG. 6 is a structurally schematic view of a microbial capsule.

First method: An output pipe 38 is connected with a first grouting cylinder 30. The first grouting cylinder 30 is configured to intermittently spout the mixture of the microbial capsules and the water. When the mixture enters a first through-hole 63 through the delivery pipe 21, one eccentric wheel 57 corresponding to the first through-hole 63 rotates, one protrusion 55 of the one eccentric wheel presses downwardly a stop block 22 which is located at an upper end of one valve body 23, so that a sealing plate 26 of the one valve body 23 moves towards a middle portion of the first grouting cylinder 30; at this time, a compression spring 24 of the one valve body 23 is compressed, the delivery pipe 21 is communicated with the first grouting cylinder 30, a large amount of the mixture enter the first grouting cylinder 30, another eccentric wheel 57 corresponding to another valve body 23 rotates, another protrusion of the another eccentric wheel presses downwardly another stop block 22 which is located at an upper end of the another valve body 23, so that the first grouting cylinder 30 is communicated with the jet pipe 15; at this time, a cam 31 located within a round housing 54 rotates for driving a connecting rod 29 and a piston 28 to move upwardly, which means that the mixture within the first grouting cylinder 30 is driven to enter the jet pipe 15; under an action of the adjustment component, the mixture within the first grouting cylinder 30 is regularly and quantitatively injected into the jet pipe 15 for ensuring that the mixture and the booster oil in the jet pipe 15 are distributed in the staggered manner. The two valve bodies in the protective housing 25 are same in working principle, but are reversed in sequence of opening and closing actions. Similarly, the two eccentric wheels respectively corresponding to the two valve bodies rotate in turn, namely, when the one protrusion of the one eccentric wheel contacts with the stop block 22 of the one valve body 23, a distance between the another protrusion of the another eccentric wheel and the stop block 22 of the another valve body is maximum; through rotating the two eccentric wheels and the cam 31, the injection and output of the mixture in the first grouting cylinder 30 per unit time is able to be controlled, and to a certain extent, the mixture is pressurized, thereby achieving a purpose of regular quantitative delivery of the water and the microbial capsules.

Second Method: The output pipe 38 is connected with the first grouting cylinder 30, the oil outlet pipe 11 is connected with a second grouting cylinder 58. The second grouting cylinder and the first grouting cylinder 30 are same in structure, a third through-hole 65 of the second grouting cylinder is communicated with the oil conduit 14, a fourth through-hole 66 of the second grouting cylinder is communicated with the jet pipe 15 through a discharge pipe 27. Through the first grouting cylinder 30 and the second grouting cylinder with same structure, the mixture and the booster oil are quantitatively controlled for alternately injecting the mixture and the booster oil into the jet pipe 15.

According to the above-mentioned embodiment, these two methods are able to be cooperated with the adjustment component, that is to say, the mixture is primarily quantitatively outputted in the first grouting cylinder 30 and then enters the output pipe 38, the piston 28 is able to pressurize the quantitatively outputted mixture to some extent; when the pressure reaches an upper limit, the mixture enters a mixing hole 36 via a connecting hole 35, and at the same time the mixture drives a slider 34 to move away from a limit ring 32 till the mixing hole 36 completely enters a jet hole. At the same time, a bottom plate 37, which is connected with an end surface of the slider 34 contacts with an inner wall of the jet pipe 15, the slider 34 is driven into the jet pipe 15 till the mixing hole 36 is coaxial with the jet pipe 15. The mixture in a form of fluid flows into the continuously flowing booster oil. When the mixture in the first grouting cylinder 30 stops outputting, the compression spring 33 which is connected with the slider 34 is recovered, so that the slider 34 is driven to an original state of the compression spring 33, the output pipe 38 is closed again. Obviously, through the output adjustment of the mixture for twice, the flowing fluids in the jet hole are the mixture and the booster oil which are distributed in the staggered manner, thereby maximizing a curing effect of water, microbial capsules and booster oil entering the fissures to the greatest extent.

Fourth Embodiment

Referring to FIG. 6 of the drawings, each of the microbial capsules has a multi-layer structure and comprises a capsule inner membrane 46, a microbial protective membrane 50 and a polyvinyl alcohol membrane 52 from outside to inside in sequence; a degreasing agent 47, a microbial culture medium 51 and calcium chloride 39 are used to fill from outside to inside in sequence. The capsule inner membrane 46 and the microbial protective membrane 50 are made from a material with faster hydrolysis rate. After the microbial capsules are injected into the fissures, the multiple oleophobic coatings 45 on the capsule inner membrane 46 are mutually exclusive with the booster oil, for driving the microbial capsules to move towards the deep part of the fissures. When the capsule inner membrane 46 is rapidly hydrolyzed, the degreasing agent 47 reacts with the booster oil. The degreasing agent 47 has a strong affinity for the booster oil, so that small particles of oil-in-water emulsion are formed for dissolving the booster oil, so as to avoid fissure blockage. The microbial culture medium 51 comprises absorb resin, bacteria and nutrient solution. After the microbial protective membrane 50 is decomposed, the activity of the bacteria in the microbial culture medium 51 is activated in water, microorganisms start to develop and reproduce. After a few days of microbial development and reproduction, the decomposition of the polyvinyl alcohol membrane 52 is completed. After overflowing, calcium chloride powders 39 solidify with the microorganisms and produce calcium carbonate precipitation, thereby achieve the effect of anti-seepage of micro-fissures.

There are often a certain number of fissures (“anhydrous fissures” or “invalid fissures”) in rock masses that are not filled with water. If the microbial capsules solidify in the invalid fissures, there is no substantial contribution to anti-seepage, which is a waste of resources. Therefore, the applicant provides a capsule outer membrane 44 outside the capsule inner membrane 46 and a foaming agent outer membrane is provided between the capsule outer membrane 44 and the capsule inner membrane 46. The foaming agent outer membrane 49 is filled with the foaming agent 48. When the microbial capsule is transported in the fissure network, the capsule outer membrane 44 is hydrolyzed, the capsule inner membrane 46 and the foaming agent outer membrane 49 migrate separately. During the migration, the foaming agent outer membrane 49 is gradually hydrolyzed.

After encountering the air enriched in the invalid fissures, the volume of the substances in the foaming agent outer membrane 49 are immediately expanded, for quickly blocking ports of the invalid fissures, thereby effectively avoiding the useless curing reaction which is caused by the bacteria and nutrient solution in the inner capsule membrane 46 entering the invalid fissures. Therefore, the purpose of automatically avoiding invalid fissures is achieved, and the accurate anti-seepage of hydrous fissures is also achieved while reducing the waste of microbial capsule resources. The PNIPAm material is used to carry out dense dotted distribution coating on the outer wall of the capsule inner membrane to form an oleophobic coating 45. The PNIPAm material is hydrophilic and oleophobic.

The capsule outer membrane 44, the capsule inner membrane 46, the foaming agent outer membrane 49 and the microbial protective membrane 50 are all made from sodium alginate, so that it is ensured that the hydrolysis is realized in a short time after the microbial capsules are injected into the target fissures. A grouting time of the microbial capsules is in a range of 4 to 6 hours, a hydrolysis time of the capsule outer membrane 44 is in a range of 10 to 15 min, a hydrolysis time of the foaming agent outer membrane 49 is in a range of 10 to 15 hours, a hydrolysis time of the capsule inner membrane 46 is in a range of 3 to 5 hours, a hydrolysis time of the microbial protective membrane 50 is in a range of 2 to 4 hours, a hydrolysis time of the polyvinyl alcohol membrane 52 is in a range of 3 to 4 days. The release time of various substances filled in the microbial capsules is different, that is, after the capsule outer membrane 44 is quickly decomposed, the degreasing agent 47 is first released and undergoes a saponification reaction with the booster oil to avoid the pollution of the booster oil to the water in the fissures, and then the bacteria and nutrient solution are released, and the bacteria start to be activated and multiplied, and then the foaming agent 48 starts to block the invalid fissures, and finally calcium chloride 39 is released and solidified with the bacteria to induce the production of calcium carbonate, which completes the curing and anti-seepage process for fissures.

What is claimed is:

1. A microorganism curing anti-seepage device based on capsule transmission and control, the device comprising a stock bin (1) which comprises a mixing bin (9) and an oil storage bin (10) separated from the mixing bin (9), wherein a feed pipe (2) communicated with the mixing bin (9) is provided on the stock bin (1), microbial capsules and water enter the mixing bin (9) through the feed pipe (2), an oil injection pipe (7) communicated with the oil storage bin (10) is provided on the stock bin (1), a central shaft (8) is rotatably located within the mixing bin (9), a stirring component is provided on the central shaft (8), a delivery pipe (21) is provided at a bottom portion of the mixing bin (9), an oil conduit (14) is provided at a bottom portion of the oil storage bin (10), a jet pipe (15) is provided at a junction of the oil conduit (14) and the delivery pipe (21), an adjustment component is provided on the delivery pipe (21) for controlling opening or closing between the delivery pipe (21) and the jet pipe (15), wherein:

a lower end of the feed pipe (2) is closed and located within the mixing bin (9), an outer diameter of the lower end of the feed pipe (2) decreases along an axis thereof towards a middle portion of the mixing bin (9), a fan blade (5) is rotatably located at a middle portion of an inner wall of the lower end of the feed pipe (2), an end surface of the lower end of the feed pipe (2) has multiple discharge holes (6) which are communicated with the mixing bin (9), a water injection pipe (3) coaxial with the fan blade (5) is provided within the feed pipe (2), two side walls of the feed pipe (2) has two feed holes (4), respectively.

2. The microorganism curing anti-seepage device based on capsule transmission and control, as recited in claim 1, wherein a duct (19) is provided at a bottom portion of the mixing bin (9), and is communicated with a first pressure compartment (53) through a second booster pump (20), the delivery pipe (21) is communicated with the first pressure compartment (53); an oil outlet pipe (11) is provided at a bottom portion of the oil storage bin (10), and is communicated with a second pressure compartment (13) through a first booster pump (12), the oil conduit (14) is communicated with the second pressure compartment (13).

3. The microorganism curing anti-seepage device based on capsule transmission and control, as recited in claim 2, wherein the stirring component comprises two main stirring blades (16) and an assistant stirring blade (18); the two main stirring blades (16) are fixed on an outer circumferential wall of the central shaft (8) and respectively located at two sides of the assistant stirring blade (18), each of the two main stirring blades (16) has multiple water permeable holes (17), a shaft sleeve (40) is sleeved on the central shaft (8), a circular groove (41) is provided on an inner circumferential wall along a circumferential direction of the shaft sleeve (40), two limit blocks (43) are symmetrically provided within the circular groove (41), two servo modules (42) are symmetrically provided on the outer circumferential wall of the central shaft (8), the two servo modules (42) and the two limit blocks (43) are distributed in the staggered manner.

4. The microorganism curing anti-seepage device based on capsule transmission and control, as recited in claim 1, wherein the stirring component comprises two main stirring blades (16) and an assistant stirring blade (18); the two main stirring blades (16) are fixed on an outer circumferential wall of the central shaft (8) and respectively located at two sides of the assistant stirring blade (18), each of the two main stirring blades (16) has multiple water permeable holes (17), a shaft sleeve (40) is sleeved on the central shaft (8), a circular groove (41) is provided on an inner circumferential wall along a circumferential direction of the shaft sleeve (40), two limit blocks (43) are symmetrically provided within the circular groove (41), two servo modules (42) are symmetrically provided on the outer circumferential wall of the central shaft (8), the two servo modules (42) and the two limit blocks (43) are distributed in the staggered manner.

5. The microorganism curing anti-seepage device based on capsule transmission and control, as recited in claim 1, wherein each of the microbial capsules (400) comprises a capsule inner membrane (46), a microbial protective membrane (50) and a polyvinyl alcohol membrane (52) from outside to inside in sequence; the polyvinyl alcohol membrane (52) is filled with calcium chloride (39), a microbial culture medium (51) is filled between the microbial protective membrane (50) and the polyvinyl alcohol membrane (52), a degreasing agent (47) is filled between the capsule inner membrane (46) and the microbial protective membrane (50), multiple oleophobic coatings (45) are coated on an outer wall of the capsule inner membrane (46).

6. The microorganism curing anti-seepage device based on capsule transmission and control, as recited in claim 5, wherein the each of the microbial capsule further comprises a capsule outer membrane (44) wrapped around the capsule inner membrane (46), a foaming agent outer membrane (49) is provided between the capsule outer membrane (44) and the capsule inner membrane (46), the foaming agent outer membrane (49) is filled with a foaming agent (48).

7. The microorganism curing anti-seepage device based on capsule transmission and control, as recited in claim 6, wherein the capsule outer membrane (44), the capsule inner membrane (46), the foaming agent outer membrane (49) and the microbial protective membrane (50) are all made from sodium alginate.

\* \* \* \* \*